April 28, 1970     W. L. KOCH     3,508,405
SECTIONAL FLUME AND MEANS TO SUPPORT THE SAME
Filed Oct. 31, 1968     2 Sheets-Sheet 2
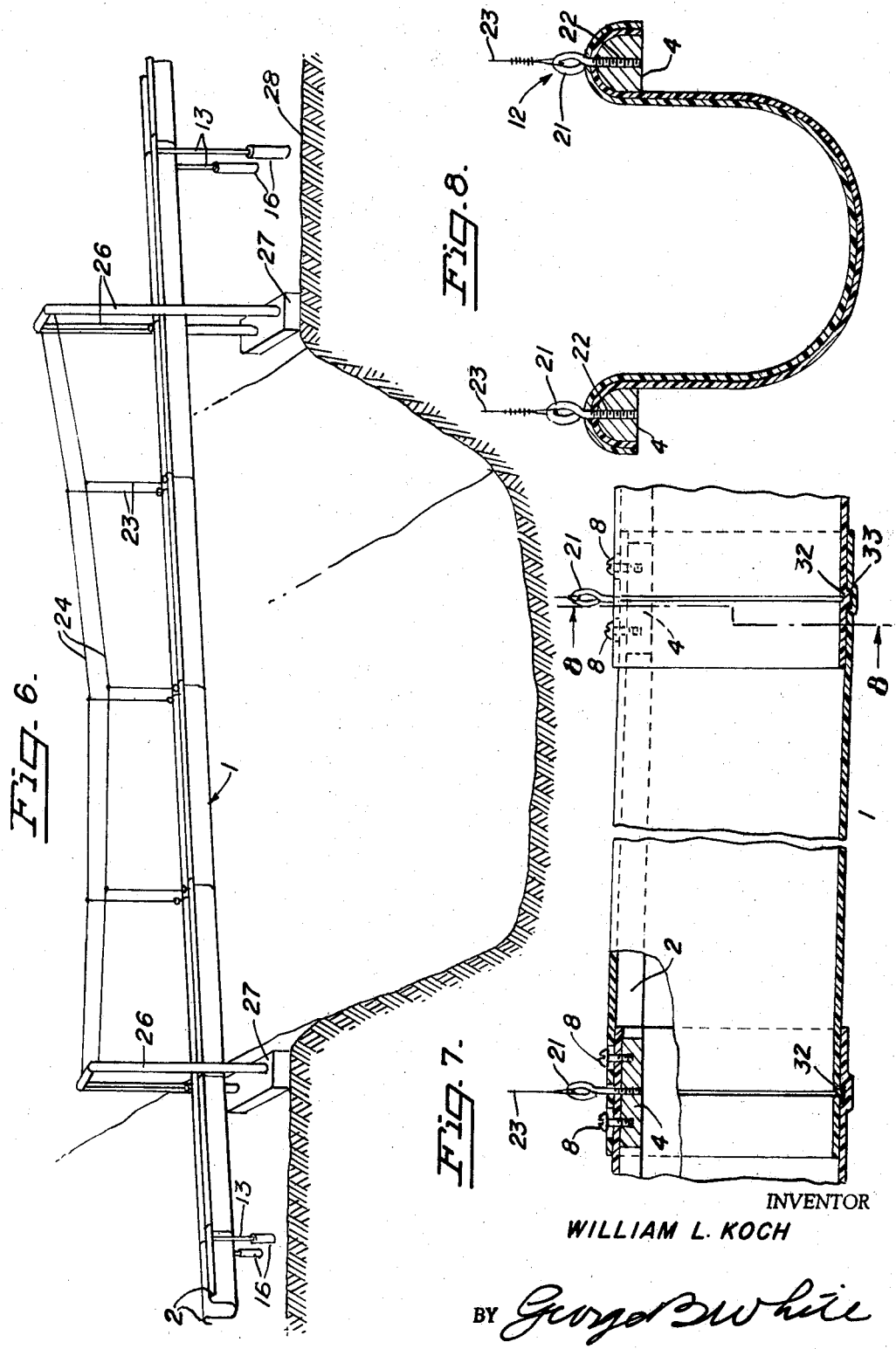
INVENTOR
WILLIAM L. KOCH
BY George B. White
ATTORNEY United States Patent Office 3,508,405
Patented Apr. 28, 1970

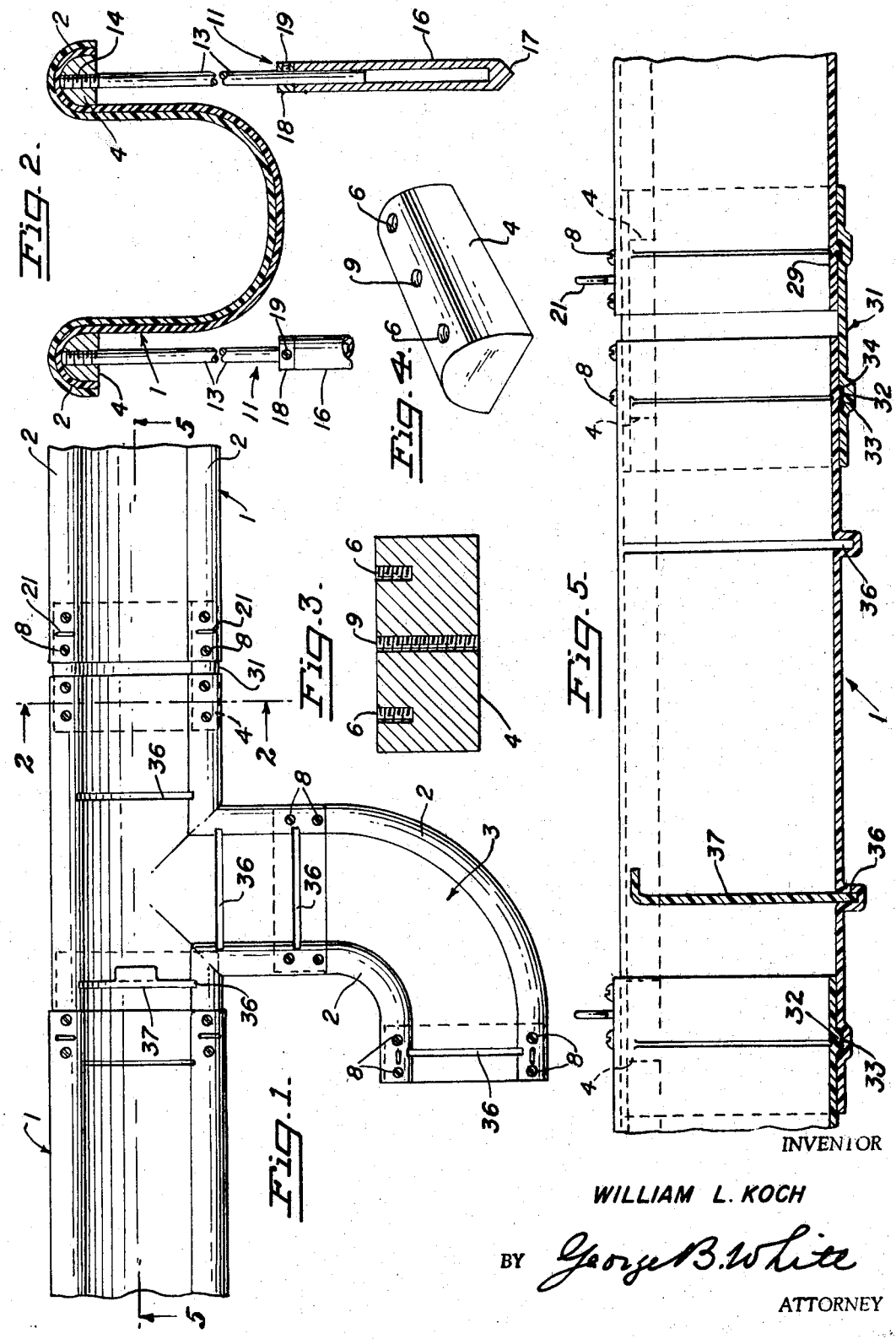

3,508,405
SECTIONAL FLUME AND MEANS TO
SUPPORT THE SAME
William L. Koch, San Francisco, Calif., assignor to H.
Koch & Sons, Inc. Corte Madera, Marin County,
Calif., a division of Global Systems, a Gulf Western
company
Filed Oct. 31, 1968, Ser. No. 772,243
Int. Cl. E02b 9/04
U.S. Cl. 61—14                                      6 Claims

ABSTRACT OF THE DISCLOSURE

The sections of the flume are made of firm plastic material, such as fiberglass reinforced plastic, and have trough-like cross-section having outwardly curved flanges along the free longitudinal edges; the curved flanges at one end of each section are reduced so that the wider ends of the flanges at the meeting end of the next section can be fitted over reduced ends; a solid fastening block is inserted under each curved flange and is secured to the overlapping flange; the fastening blocks are threaded for selective engagement either by adjustable standards or by a hook or eye for suspension wires; the overlapping portions have a narrow rib around the outside of the trough resting in a recessed sealing pad in the overlapping end of the adjacent section.

BACKGROUND OF THE INVENTION

The herein invention is an improvement on the type of conduit described in the co-pending application of William L. Koch for Fluid Distribution Means, Ser. No. 680,101, filed on Nov. 2, 1967 and now Patent No. 3,440,025.

The improvements consist in facilitating the engagement of the overlapping ends of the sections and improving the sealing between the overlapping ends, as well as providing securing means under the over-lapping ends connectable either to adjustable standards on the ground or to suspension wires overhead, thereby to provide for quick assembly of a continuous conduit over land as well as over chasms or depressions on the ground and to avoid the necessity of conforming to the contour of the ground by the assembled conduit.

DESCRIPTION OF DRAWINGS

FIG. 1 is an assembled conduit at one of the outlets.

FIG. 2 is a cross-sectional view, the section being taken on lines 2—2 of FIG. 1 showing the supporting block connected to an adjustable standard.

FIG. 3 is a cross-sectional view of the supporting and joining block.

FIG. 4 is a perspective view of the supporting block.

FIG. 5 is a longitudinal sectional view, the section being taken on lines 5—5 of FIG. 1.

FIG. 6 is a perspective somewhat diagrammatic view showing the manner of suspension of the conduit.

FIG. 7 is a fragmental sectional view of the suspended conduit.

FIG. 8 is a cross-sectional view of the suspended conduit.

DESCRIPTION OF A PREFERRED EMBODIMENT

Each flume section 1 is of generally trough-like cross-section and has a longitudinal flange 2 at each edge thereof. Each flange 2 is substantially semi-cylindrical and is inverted outwardly of the trough. In the event of curved outlets or connections such as the curved connecting section 3, the flanges 2 are correspondingly curved longitudinally.

In assembling the conduits, one end of a section is nested in or laid in the adjacent or meeting end of the next section so that the curved flanges 2 also overlap.

In the hollow underside of each of the overlapping ends of the flanges 2 is inserted a solid block 4, preferably made of firm material such as metal. The block 4 is provided with a pair of threaded securing holes 6 which are in registry with corresponding slots 7 in the overlapping ends of the flanges 2 of the conduit sections so that suitable securing screws 8 can be inserted to fasten the overlapping ends of the flanges 2 on the supporting block 4.

The supporting block 4 has a threaded hole 9 extending completely through the entire height of the block 4, for selective engagement either by an adjustable standard 11, from below, shown in FIG. 2, or by suspension hook and wire 12 from above shown in FIG. 8.

Each standard 11 is adjustable in order to hold the trough section 1 level irrespective of the transverse contour of the land over which the conduit is assembled. For this purpose each standard includes a rod 13 the threaded upper end 14 of which is threaded into the hole 9 of the block 4. The rod 13 telescopes into the matching passage 14 of a hollow spike 16, the point 17 of which latter facilitates the driving of the hollow spike into the ground. The rod 13 is held at an adjusted height by a collar 18 resting on the top of the spike 16 and held in adjusted position on the rod 13 by a set screw 19.

The suspension eye 21 has a stem 22 screwed into the block 4 through the overlapping ends of the flanges 2. A suspension wire 23 is suitably secured in the eye 21 and is in turn supported on overhead cables or wires 24, which latter are suitably anchored on upright frames 26, supported on a suitable base 27 on the ground 28 at opposite rims of a depression spanned by the suspended conduit.

In the form herein shown, one end of each trough 1 or 3 has a reduced end 29 at one end which fits into the adjacent wider end 31 of the next section. If, in the course of assembling, it occurs that the meeting ends of the sections are both reduced, then a coupling section 31, shown in FIG. 5, may be utilized so that the respective reduced ends 29 rest in the wider ends of the coupling 21.

To improve the seal between the overlapping ends, one end of each section is provided with a narrow rib 32 on the exterior of the trough which rib imbeds itself in a compressible sealing ring 33 in a recess 34 on the inside of the overlapping meeting end of the next section or coupling.

The sections at intersections or outlets have a groove 36 to accommodate a gate 37 for suitable control or flow diversion.

OPERATION

The improvements herein described facilitate the positive assembly of the sections as well as the firm supporting of the assembled sections in properly adjusted positions so as to produce a suitable incline for the flow of water through the assembled conduit, yet firmly sealing the overlapping ends so as to prevent seepage of water from the same. The sections and the assembled parts herein described combine to accomplish a result quickly and efficiently, yet their arrangement, assembly and operation can be done simply, and this invention is eminently adapted for its purposes, particularly in distributing water at selected height from the ground over extended land areas.

I claim:
1. In a fluid conduit including,
conduit sections of trough-like cross-section with an inverted curved flange along each longitudinal edge of each section,
the improvement of, a securing block inserted into the space in the underside of the overlapping curved flanges of adjacent sections, means to secure said block and said overlapping ends of the sections together, and adjustable supporting means connected to each block for supporting the overlapping ends of said sections.

2. The invention defined in claim 1, and said adjustable supporting means consisting of an adjustable spike support adapted to be driven into the ground and an overhead suspension support, and means on said block selectively connectable to said spike means and to said suspending means.

3. The invention defined in claim 2, said spike support means including a hollow spike adapted to be driven in the ground, a rod slideably fitting into the passage of the hollow spike, means on the rod to connect the rod to said block, an element on the rod, adjustable longitudinally on the rod to support the rod in said spike in a preadjusted position.

4. The invention defined in claim 2, said suspension means including an overhead suspension structure, spaced frames to support the overhead suspension structure, suspending lines extended from said suspension structure to said blocks, and means to connect the suspending lines to the respective blocks.

5. The invention defined in claim 1, and the inverted flanges at one end of each section being reduced in diameter so as to fit into the inverted wider flanges on the other end of the next section.

6. The invention defined in claim 1, and sealing means between adjacent ends of said sections comprising, a rib extended around the exterior of the nesting end of the section, and a compressible sealing cushion in the adjacent overlapping end of the next adjacent section in which said rib is nested.

References Cited

UNITED STATES PATENTS

| | | | |
|---|---|---|---|
| 967,241 | 8/1910 | Robinson | 61—14 |
| 1,055,426 | 3/1913 | Smith | 61—15 |

FOREIGN PATENTS

| | | |
|---|---|---|
| 448,885 | 4/1968 | Switzerland. |

JACOB SHAPIRO, Primary Examiner

U.S. Cl. X.R.

138—106; 193—2